United States Patent
Manadhata et al.

(10) Patent No.: US 10,878,122 B2
(45) Date of Patent: Dec. 29, 2020

(54) TIMESTAMP ORDER-PRESERVING ENCRYPTION OF NETWORK TRAFFIC TRACES

(71) Applicant: EntIT Software LLC, Sunnyvale, CA (US)

(72) Inventors: Pratyusa K. Manadhata, Piscataway, NJ (US); Martin Arlitt, Calgary (CA); Muhammad Ihsanulhaq Sarfraz, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 411 days.

(21) Appl. No.: 15/885,560

(22) Filed: Jan. 31, 2018

(65) Prior Publication Data

US 2019/0236303 A1    Aug. 1, 2019

(51) Int. Cl.
| | | |
|---|---|---|
| G06F 21/62 | (2013.01) | |
| H04L 9/06 | (2006.01) | |
| H04L 9/32 | (2006.01) | |
| H04L 9/08 | (2006.01) | |

(52) U.S. Cl.
CPC ...... *G06F 21/6227* (2013.01); *G06F 21/6254* (2013.01); *H04L 9/06* (2013.01); *H04L 9/0894* (2013.01); *H04L 9/3297* (2013.01); *H04L 2209/34* (2013.01); *H04L 2209/42* (2013.01)

(58) Field of Classification Search
CPC ....... H04L 9/3297; H04L 9/06; H04L 9/0894; H04L 2209/34; H04L 2209/42; G06F 21/6227; G06F 21/6254
See application file for complete search history.

(56) References Cited

U.S. PATENT DOCUMENTS

| | | | |
|---|---|---|---|
| 9,392,007 B2 | 7/2016 | Giokas | |
| 10,181,988 B1* | 1/2019 | Farah | H04L 41/06 |
| 2003/0037232 A1* | 2/2003 | Bailiff | G06F 21/6263 |
| | | | 713/153 |
| 2012/0246303 A1 | 9/2012 | Petersen et al. | |

FOREIGN PATENT DOCUMENTS

WO    WO-2005060202 A1    6/2005

OTHER PUBLICATIONS

Shafagh (Poster: Towards Encrypted Query Processing for the Internet of Things, MobiCom '15: Proceedings of the 21st Annual International Conference on Mobile Computing and Networking, Sep. 2015 pp. 251-253, retrieved from https://doi.org/10.1145/2789168.2795172) (Year: 2015).*

(Continued)

*Primary Examiner* — Brian F Shaw

(57) ABSTRACT

According to examples, an apparatus may include a processor and a memory on which is stored machine readable instructions to cause the processor to access network traffic traces including a plurality of timestamps, the plurality of timestamps having an order with respect to each other. The instructions may also cause the processor to encrypt the plurality of timestamps to anonymize the plurality of timestamps while preserving the order of the plurality of timestamps with respect to each other and to store the encrypted plurality of timestamps in a data store.

20 Claims, 4 Drawing Sheets

(56) References Cited

OTHER PUBLICATIONS

Popa (An Ideal-Security Protocol for Order-Preserving Encoding, 2013 IEEE Symposium on Security and Privacy, pp. 463-477, 2013) (Year: 2013).*

Sashank (security in format preserving encryption, 2015, retrieved May 11, 2020 from https://crypto.stackexchange.com/questions/25987/security-in-format-preserving-encryption) (Year: 2015).*

Victor Onomza Waziri, et al., "Big Data Analytics and Data Security in the Cloud via Fully Homomorphic Encryption", World Academy of Science, Engineering and Technology International Journal of Computer and Information Engineering, vol. 9, No. 3, 2015Nov. 3, 2015, pp. 744-753 http://www.waset.org/publications/10000912.

Cisco, "Encrypted Traffic Analytics", 2017, 9 pages. https://www.cisco.com/c/dam/en/us/solutions/collateral/enterprise-networks/enterprise-network-security/nb-09-encrytd-traf-anlytcs-wp-cte-en.pdf.

Symantec, "Symantec Security Analytics Software—See, Understand, and Resolve Advanced Attack", 2017, 2 pages. https://www.symantec.com/content/dam/symantec/docs/data-sheets/security-analytics-software-en.pdf.

Guillermo Navarro-Arribas, et al., "User K-Anonymity for Privacy Preserving Data Mining of Query Logs", Information Processing and Management 48, 2012, pp. 476-487. https://pdfs.semanticscholar.org/5e4e/018f77d23cb9b48695e716947cd8f3e4793d.pdf.

* cited by examiner

TIMESTAMP ORDER-PRESERVING ENCRYPTION OF NETWORK TRAFFIC TRACES

BACKGROUND

Network traffic traces may be utilized for activities such as workload characterization, traffic engineering, web performance, malicious activity diagnosis and more generally, network performance analysis and simulation. The network traffic traces may include a set of records that describe network traffic where each record may have different features pertaining to timestamps, Internet Protocol (IP) addresses, ports involved in sending and receiving network data, numbers of packets, bytes transferred, etc. The network traffic data may have a large mix of categorical and continuous attributes.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
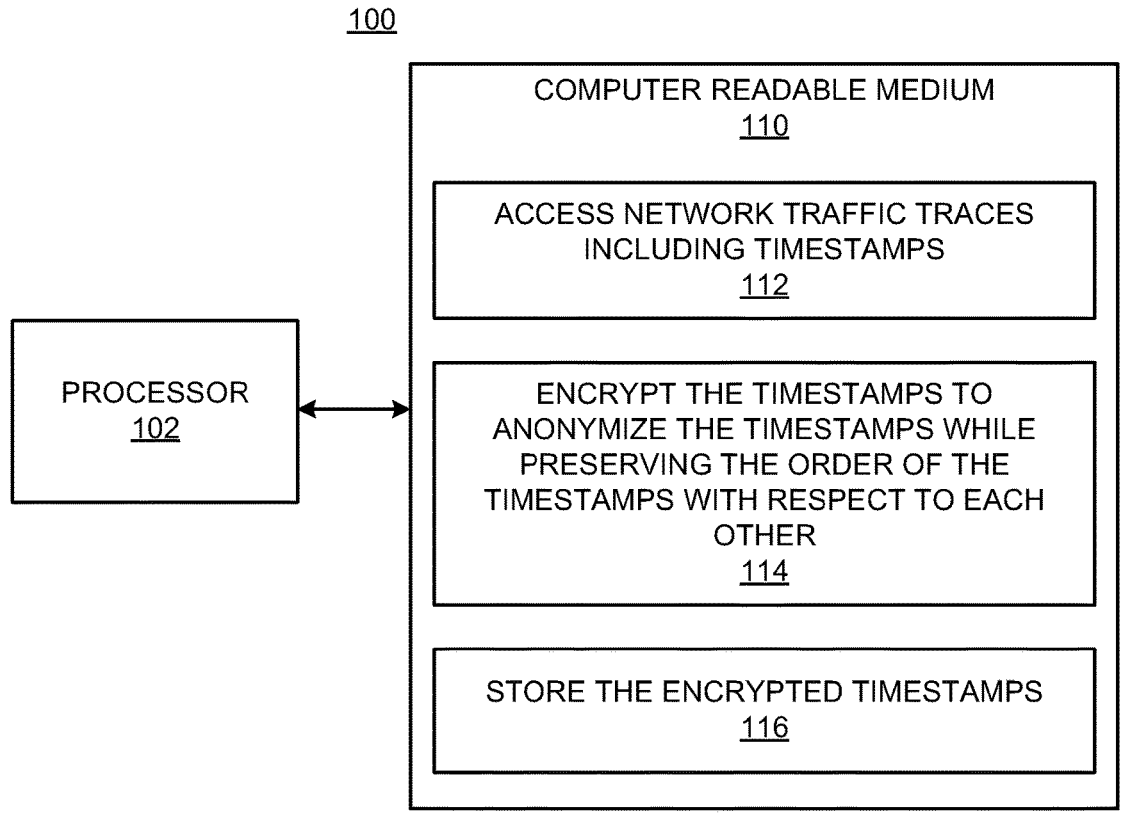
FIG. 1 shows a block diagram of an example apparatus that may encrypt various portions of data contained in network traffic traces.

Publicly available traffic traces are rare because Internet service providers (ISPs) and other traffic trace owners typically hesitate to make their network activity information publicly available. One major reason why traffic trace owners typically hesitate to make the network traffic traces publicly available is the concern that confidential and private information regarding the network traffic traces, e.g., senders and receivers of packets through the network traffic, websites visited, times at which the data packets were communicated, or the like, may be inferred from the network traffic traces.

In addition, Enterprise Security Operation Centers (SOCs) collect, store, and analyze network logs and device logs to identify and respond to security relevant events such as attacks and breaches. The enterprise may also store the network logs and device logs in manners that comply with various regulations while enabling analysis of the data contained in the network logs and device logs. These logs, however, contain privacy sensitive information and malicious SOC analysts may infer sensitive information about the enterprise's employees from the logs. For example, DNS and HTTP logs collected in the enterprise may reveal the websites visited by an employee, which may further lead to information about an employee's financial situation and health condition. In addition, if the logs were exfiltrated and made their way to malicious third parties, then that may create further privacy challenges for the enterprise.

These privacy issues may be avoided if the logs were stored in an encrypted format. Encrypted logs may solve another challenge faced by R&D teams, e.g., lack of real world data. Customers may be more willing to share their logs if they were encrypted. These scenarios motivate the need for a system that provides security and privacy guarantees for sensitive network traffic data and enables analytics directly over encrypted data.

Disclosed herein are apparatuses and methods that may address these issues simultaneously through use of encryption and anonymization techniques. Particularly, the apparatuses and methods disclosed herein may employ encryption schemes that enable useful information from the network traffic traces, such as IP address prefixes, timestamp orders, and/or URLS, to be preserved. In addition, the apparatuses and methods disclosed herein may enable useful analytics to be performed on the underlying data contained in the network traffic traces without decrypting the data. The apparatuses and methods disclosed herein may enable some secure analytics to be performed on encrypted network traffic data without decrypting the encrypted network traffic data first. Particularly, for instance, the apparatuses and methods disclosed herein may employ encryption schemes that encrypt timestamps, universal resource locators (URLs), and IP addresses contained in the network traffic traces.

Through implementation of the apparatuses and methods disclosed herein, greater privacy and security measures may be afforded, which may result in the ISPs and other network traffic trace owners making the network traffic traces more readily available. That is, the ISPs and other network traffic trace owners may make the network traffic traces more readily available because they may have greater assurance that the information contained in the network traffic traces may be more secure and confidential. The apparatuses and methods disclosed herein may also reduce the number of employees within an organization who need to see the raw data, as now some employees, e.g., junior security analysts, may work with the encrypted data and not the raw data. As such, the apparatuses and methods disclosed herein may reduce insider threats within an organization.

In addition, the apparatuses and methods disclosed herein may make the security and privacy measures practical without being inhibitive in their support for analytics on the network traffic traces. In one regard, the apparatuses and methods disclosed herein may enable an intermediate design point in terms of providing confidentiality and privacy for network traffic by allowing execution of analytics over encrypted data. That is, for instance, the apparatuses and methods disclosed herein may provide support for cryptography-based prefix format-preserving of IP addresses, order-preserving encryption of timestamps, and format-preserving encryption of URLs.

A technical problem that the present disclosure may address may be that analysis of fully encrypted network traffic traces may not provide sufficiently detailed information and analysis of unencrypted network traffic traces may not afford a sufficient level of privacy and confidentiality. A technical solution presented by the present disclosure may be that by encrypting the timestamps in network traffic traces in an order-preserving manner and by encrypting the URLs in network traffic traces in a format-preserving manner, at least some of the information contained in the network traffic traces may be encrypted, thus enhancing privacy of that information. In addition, a processor may perform analysis on the encrypted timestamps and URLs without having to decrypt the timestamps and URLs, which may enable the processor to perform the analysis in a relatively fast and efficient manner. That is, by not being required to decrypt the encrypted versions of the timestamps and URLs to analyze the network traffic information, the processor may perform analyses on the network traffic information in a relatively efficient manner.

Before continuing further, it should be understood that the terms "a" and "an" are intended to denote at least one of a particular element. As used herein, the term "includes" means includes but not limited to, the term "including" means including but not limited to. The term "based on" means based at least in part on.

With reference first to FIG. 1, there is shown a block diagram of an example apparatus 100 that may encrypt various portions of data contained in network traffic traces. It should be understood that the apparatus 100 may include additional components and that some of the components described herein may be removed and/or modified without departing from a scope of the apparatus 100 disclosed herein.

The apparatus 100 may include a processor 102, which may be a semiconductor-based microprocessor, a central processing unit (CPU), an application specific integrated circuit (ASIC), a field-programmable gate array (FPGA), and/or another hardware device. Although a single processor 102 is depicted, it should be understood that the apparatus 100 may include multiple processors, multiple cores, or the like, without departing from a scope of the apparatus 100.

The apparatus 100 may also include a non-transitory computer readable medium 110 that may have stored thereon machine-readable instructions that the processor 102 may execute. Examples of the machine-readable instructions are shown as 112-116 and are further discussed below. Examples of the non-transitory computer readable medium 110 may include an electronic, magnetic, optical, or other physical storage device that contains or stores executable instructions. For example, the non-transitory computer readable medium 110 may be a Random Access memory (RAM), an Electrically Erasable Programmable Read-Only Memory (EEPROM), a hard disk, an optical disc, or other type of storage device.

The processor 102 may fetch, decode, and execute the machine-readable instructions 112 to access network traffic traces that include timestamps. The network traffic traces, which may include various types of network traffic information, such as NetFlow logs, which may retain records for the traffic flows on a network. The network traffic information may include, for instance, IP addresses of sources of network packets, IP addresses of destinations of the network packets, timestamps identifying dates and times at which the network packets were communicated, URLs of websites that clients visited, etc. The processor 102 may access the network traffic traces from, for instance, ISPs or other owners of the network traffic traces, from an apparatus or service that maintains network logs within a network, or the like.

The processor 102 may fetch, decode, and execute the machine-readable instructions 114 to encrypt the timestamps to anonymize the timestamps while preserving the order of the timestamps with respect to each other. That is, the processor 102 may encrypt the timestamps to anonymize the dates and/or times identified in the timestamps, while the order of the timestamps may still be identified in the encrypted version of the timestamps. As discussed herein, the processor 102 may also encrypt later-received timestamps following an initial encryption of the timestamps, while preserving the order of the later-received timestamps with respect to the initially encrypted timestamps. That is, the order of the later-received timestamps may be preserved with respect to each other as well as with the earlier-received timestamps. In any regard, by preserving the order of the timestamps, operations such as sorting, range checks, ranking, or the like may be performed on the encrypted timestamps without having to first decrypt the encrypted timestamps.

According to examples, the processor 102 may implement an order-preserving encryption or encoding scheme. That is, the processor 102 may implement an encoding scheme in which:

$$Enc(x) > Enc(y) i\_x > y.$$ Equation (1):

By way of particular example, the processor 102 may implement the order-preserving encryption scheme by building a balanced search tree containing all of the encrypted timestamps, in which the timestamps may be converted to plaintext values. The order-preserving encoding of a plaintext value is the path from the root to that value in the search tree. Thus, if x is less than y, the path to x will be to the left of the path to y. The tree paths may be represented using a binary encoding where the encodings increase from left to right in a tree.

Figure 2:
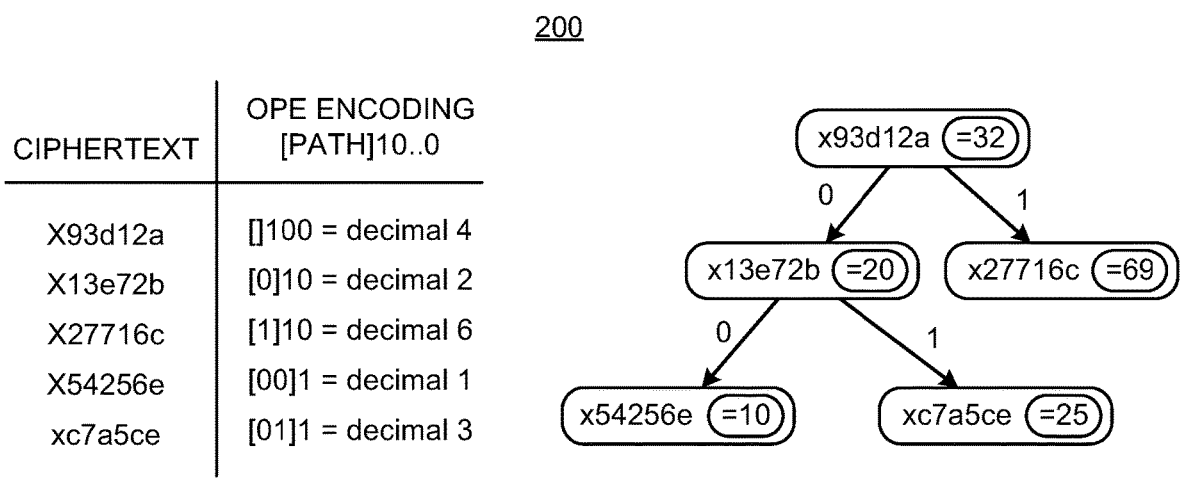
FIG. 2 shows an example order-preserving tree.

The following example is provided with respect to FIG. 2, which shows an example order-preserving tree 200, to demonstrate how this encoding scheme may work using an example with integers. The only difference between this example and timestamps may be that since order-preserving schemes work with integers, the processor 102 may convert the timestamps from a date format to a UNIX timestamp in integer format first before interacting with the order-preserving encoding scheme. In this example, the following values 69, 32, 20, 10, and 25 are to be encrypted. A potential set of order-preserving encodings for these values is 5, 4, 2, 1, and 3, respectively. This encoding may be ideal because this encoding may simply inform the server of the order of the values, and nothing else. However, the challenge in achieving such an encoding is that, when an input x (e.g., 69) is encoded, the future values to be encoded may not be known and thus, the order of x with respect to the current number may not be known (e.g., that 69 will be the fifth value). To address this problem, the processor 102 may organize the encoded values in a search tree. A binary search tree is a tree in which for each node v, all of the nodes in the left subtree of v are strictly smaller than v and all of the nodes in right subtree of v are strictly larger than v.

In the search tree 200 shown in FIG. 2, each node of the search tree 200 may contain the deterministic encryption of a value under a secret key, but the ciphertexts may be arranged in the search tree 200 based on the order of the plaintext values. In addition, the processor 102 may insert a new value in order to arrange the values in the search tree 200 in an orderly form, e.g., the processor 102 may find the location in the search tree 200 where to insert the new value. To illustrate how the processor 102 may insert a new value, the processor 102 may encode the value "55" using the search tree 200 shown in FIG. 2. The processor 102 may first identify the root node of the search tree 200, e.g., 93d12a in this example. The processor 102 may determine that the root node value is 32. Because the new value 55>32, the processor 102 may identify the right child of the root node, e.g., 27716c, which the processor may determine as being 69. Finally, the processor 102 may determine that there is no left child of the last node. This may mean that the processor 102 may insert a new node in this position, containing the deterministic encryption of 55. The processor 102 may search the search tree 200 and may determine the position of the new value without decrypting the nodes in the search tree 200.

To determine the encoding of 55, the path from the root node down to the node may be observed as indicating the relative order of the node with respect to the other tree nodes. If each left edge is labeled with a '0' bit and each right edge is labeled with a '1' bit, the path to a node from the root node may be represented using the bitwise concatenation of labels from the corresponding tree edges. For example, the path for the value 10 is (binary) 00, which is decimal 0; the path of 25 is (binary) 01, which is decimal 1; and the path of 55 is (binary) 10, which is decimal 2. These values may preserve the order of the plaintexts. However, nodes higher in the tree may be considered. For example, the path of 32 (the root) is the empty string. The empty string is not larger than 0 and smaller than 2. Therefore, all of the paths to the same length (e.g., 32 or 64 bits in practice) may be padded by defining the order preserving encoding (OPE) of a value as follows: OPE encoding=[path]10 . . . 0, where there are as many zero bits as necessary to pad the value to a desired ciphertext size m. For example, if m=3 as in FIG. 2, the encoding of the root value 32 is decimal 4, the encoding of 10 is decimal 1, and the encoding of 55 is decimal 5. The order of encodings may be preserved for all values.

The processor 102 may fetch, decode, and execute the machine-readable instructions 116 to store the encrypted timestamps. The processor 102 may store the encrypted timestamps, e.g., in a locally attached data store (not shown) or a network attached data store (not shown). In any regard, the processor 102 may store the encrypted timestamps such that the order of the encrypted timestamps may be identified from the stored version of the encrypted timestamps. In addition, the processor 102 may add the timestamps of data contained in additional network traffic traces with respect to the encrypted timestamps stored in the data store, while preserving the order of the timestamps with respect to each other.

Figure 3A:
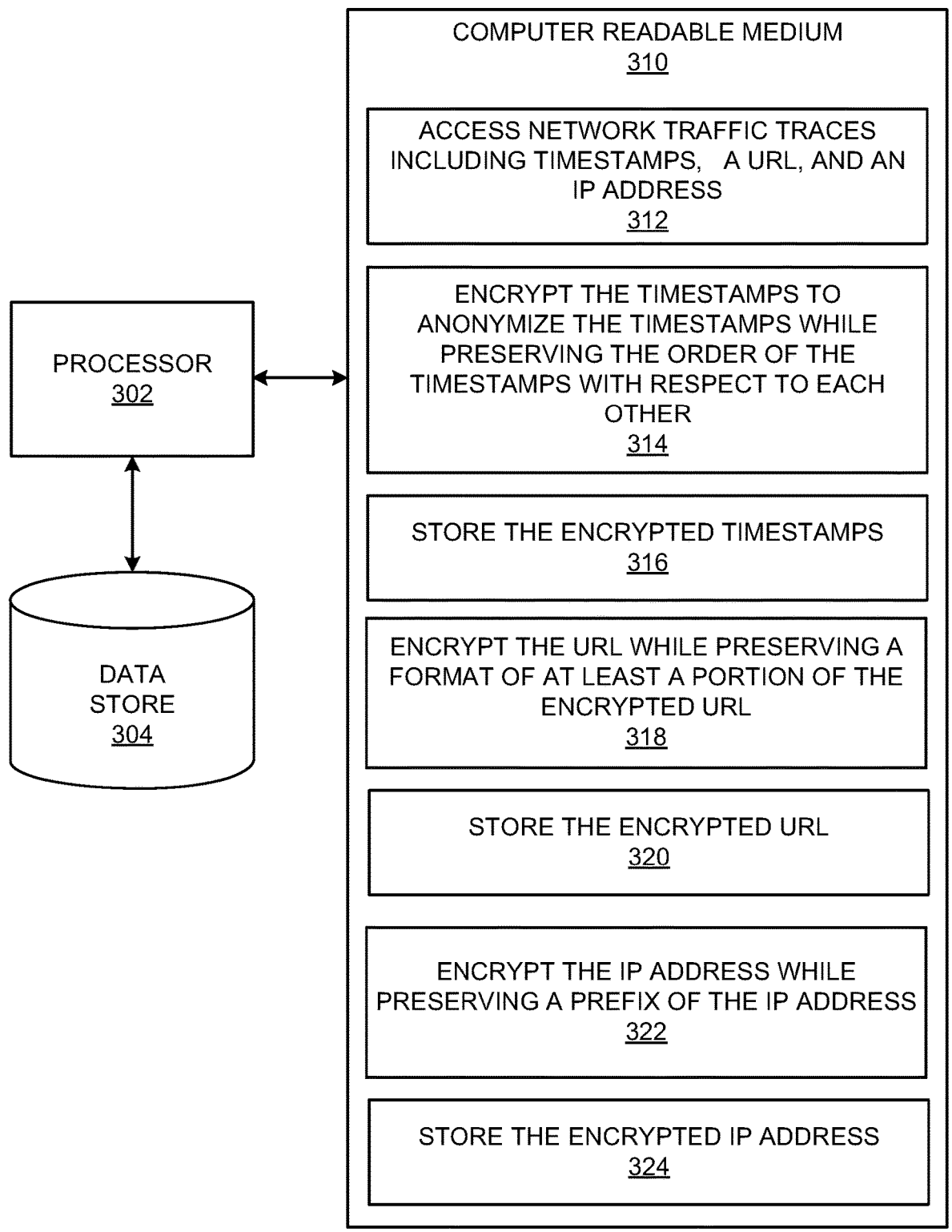
FIG. 3A shows a block diagram of another example apparatus that may encrypt various portions of data contained in network traffic traces.

Turning now to FIG. 3A, there is shown a block diagram of another example apparatus 300 that may encrypt various portions of data contained in network traffic traces. It should be understood that the apparatus 300 may include additional components and that some of the components described herein may be removed and/or modified without departing from a scope of the apparatus 300 disclosed herein.

The apparatus 300 may include a processor 302, which may be a semiconductor-based microprocessor, a central processing unit (CPU), an application specific integrated circuit (ASIC), a field-programmable gate array (FPGA), and/or another hardware device. Although a single processor 302 is depicted, it should be understood that the apparatus 300 may include multiple processors, multiple cores, or the like, without departing from a scope of the apparatus 300. The apparatus 300 may also include a data store 304 on which the processor 302 may store or retrieve data. The data store 304 may include an electronic, magnetic, optical, or other physical storage device. In addition, although the data store 304 is depicted as being in direct communication with the processor 302, the processor 302 may instead communicate with the data store 304 via a network (not shown).

The apparatus 300 may also include a non-transitory computer readable medium 310 that may have stored thereon machine-readable instructions that the processor 302 may execute. Examples of the machine-readable instructions are shown as 312-324 and are further discussed below. Examples of the non-transitory computer readable medium 310 may include an electronic, magnetic, optical, or other physical storage device that contains or stores executable instructions. For example, the non-transitory computer readable medium 310 may be a Random Access memory (RAM), an Electrically Erasable Programmable Read-Only Memory (EEPROM), a hard disk, an optical disc, or other type of storage device.

The processor 302 may fetch, decode, and execute the machine-readable instructions 312 to access network traffic traces that include timestamps, a URL, and an IP address. The accessed network traffic traces may additionally include multiple URLs and multiple IP addresses corresponding to collected network traffic information. The network traffic traces may include various types of network traffic information such as NetFlow logs, which may retain records for every traffic flow on a network. The processor 302 may access the network traffic traces from, for instance, ISPs or other owners of the network traffic traces, from an apparatus or service that maintains network logs within a network, or the like.

The processor 302 may fetch, decode, and execute the machine-readable instructions 314 to encrypt the timestamps to anonymize the timestamps while preserving the order of the timestamps with respect to each other. The instructions 314 may thus be similar to the instructions 112 discussed above with respect to FIG. 1. In addition, the processor 302 may fetch, decode, and execute the machine-readable instructions 316 to store the encrypted timestamps. The processor 302 may store the encrypted timestamps in the data store 304, which may be in local communication with the processor 302 or may be in communication with the processor 302 via a network (not shown). In any regard, the processor 302 may store the encrypted timestamps as discussed above with respect to the instructions 116 in FIG. 1.

The processor 302 may fetch, decode, and execute the machine-readable instructions 318 to encrypt the URL while preserving a format of at least a portion of the encrypted URL. That is, the processor 302 may encrypt the URL in a manner that preserves the format of at least one portion of the URL in the encrypted URL, e.g., the format of at least one portion of the encrypted URL may be identifiable without first decrypting the encrypted URL. The processor 302 may implement an encryption scheme in which the ciphertext must abide by a specified format. An example of an application of such an encryption scheme is in-place encryption of credit-card numbers, and other personal and financial data. In the case of credit-card numbers, this means taking in 16 decimal digits as plaintext and returning 16 decimal digits as ciphertext. The processor 302 may similar features of a format-preserving scheme to encrypt an URL. As may generally be known, URLs are integral to web proxies and also appear in other logs, such as Web server logs or intrusion detection system logs. The ability to perform in-place encrypted analytics on URLs may help determine and filter the content.

Since format-preserving encryption may primarily deal with integers and URLs are string values, the processor 302 may generate format-preserving strings is as follows:

For a string of N characters of [a-z], the processor 302 may treat the string as a base-26 value (with each character being a digit, say, A or a=0, B or b=1, . . . , Y or y=24, Z or z=25).

Perform a base conversion of that string to an integer between 0 and $26^N-1$. A suitable base conversion operation may be performed.

Use a format-preserving encryption technique to encrypt that value into another integer between 0 and $26^N-1$. According to examples, a format-preserving encryption that may take as input one integer and outputs another integer may be used.

Perform a base-26 conversion back into a string of N characters of [A-Za-z].

Figure 4:
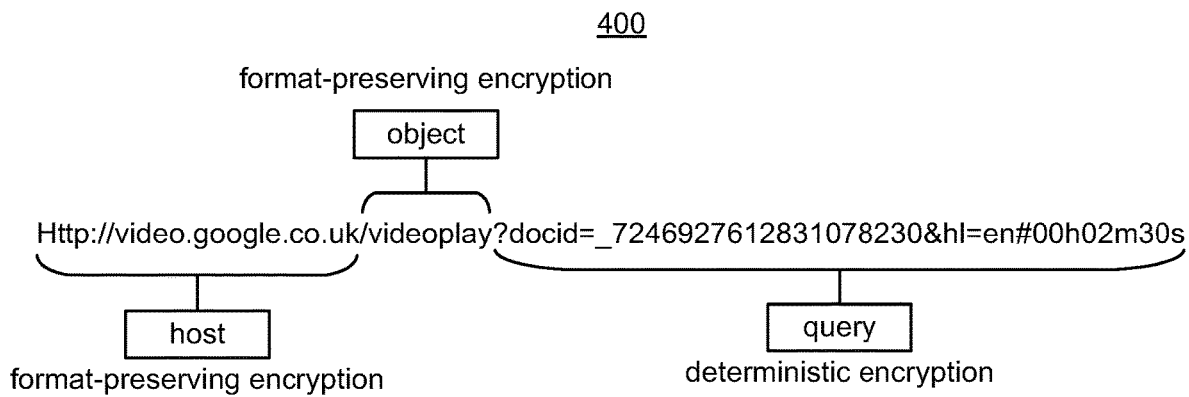
FIG. 4 depicts an example URL that may be encrypted while preserving a format of at least a portion of the encrypted URL.

An example in which a URL 400 may be encrypted while preserving a format of at least a portion of the encrypted URL 400 is depicted in FIG. 4. Particularly, as shown in FIG. 4, the processor 302 may encrypt the host section of the URL 400 using a format-preserving encryption operation and may encrypt the object section of the URL 400 using a format-preserving encryption operation. In addition, the processor 302 may encrypt the query portion of the URL 400 using deterministic encryption operation, e.g., a non-format-preserving encryption operation.

The processor 302 may fetch, decode, and execute the machine-readable instructions 320 to store the encrypted URL. The processor 302 may store the encrypted URL in the data store 304, which may be in local communication with the processor 302 or may be in communication with the processor 302 via a network (not shown).

The processor 302 may fetch, decode, and execute the machine-readable instructions 322 to encrypt the IP address while preserving a format of a prefix of the IP address. The processor 302 may encrypt the IP address through any suitable process. For instance, the processor 302 may map each distinct IPv4 address appearing in the network traffic trace is mapped to a random 32-bit address, in which the mapping is one-to-one. Anonymity of the IPv4 addresses in the original network traffic trace may be achieved by not revealing the random one-to-one mapping used in anonymizing a trace. Such anonymization, however, may result in the loss of the prefix relationships among the IP addresses and renders the trace unusable in situations where such relationship is important, e.g., understanding routing performance or clustering of end-systems.

According to examples, the processor 302 may anonymize the IP address while preserving the format the prefix of the IP address. That is, for instance, if two original IP addresses share a k bit prefix, the anonymized mappings for the two IP addresses will also share a k bit prefix. The processor 302 may consider a geometric interpretation of this form of anonymization. According to examples, the entire set of possible distinct IPv4 addresses may be represented by a complete binary tree of height 32.

The set of distinct addresses present in an unanonymized trace may be represented by a subtree of this complete binary tree where each address is represented by a leaf. The complete binary tree may be called the original address tree. Each node in the original address tree (excluding the root node) may correspond to a bit position, indicated by the height of the node, and a bit value, indicated by the direction of the branch from its parent node.

The processor 302 may fetch, decode, and execute the machine-readable instructions 324 store the encrypted IP address. The processor 302 may store the encrypted IP address in the data store 304, which may be in local communication with the processor 302 or may be in communication with the processor 302 via a network (not shown). According to examples, the processor 302 may perform analytics on the network traffic traces using the encrypted plurality of timestamps and the encrypted URL without decrypting the encrypted plurality of timestamps or the encrypted URL. In addition, or in other examples, the processor 302 may perform analytics on the network traffic traces using the encrypted plurality of timestamps, the encrypted URL, and the encrypted IP address, without decrypting the encrypted plurality of timestamps, the encrypted URL, or the encrypted IP address.

Figure 3B:
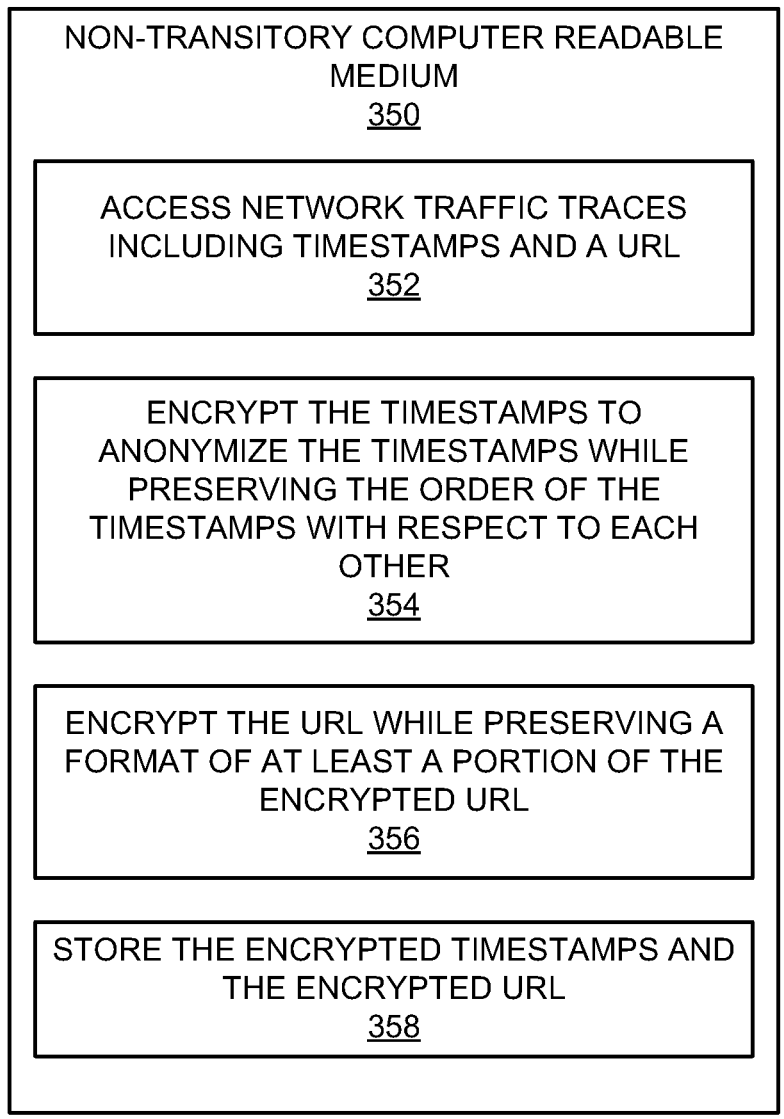
FIG. 3B shows a block diagram of an example non-transitory computer readable medium that may encrypt various portions of data contained in network traffic traces.

Turning now to FIG. 3B, there is shown a block diagram of an example non-transitory computer readable medium 350 that may encrypt various portions of data contained in network traffic traces. As shown, the non-transitory computer readable medium 350 may have stored thereon machine-readable instructions 352-358 that the processor 302 may execute. The non-transitory computer readable medium 350 may be similar to the computer readable medium depicted in FIG. 3A and discussed above.

The processor 302 may fetch, decode, and execute the machine-readable instructions 352 to access network traffic traces that include timestamps and a URL. The accessed network traffic traces may additionally include multiple URLs corresponding to collected network traffic information. The network traffic traces may include various types of network traffic information as discussed above The processor 302 may fetch, decode, and execute the machine-readable instructions 354 to encrypt the timestamps to anonymize the timestamps while preserving the order of the timestamps with respect to each other. The instructions 354 may be similar to the instructions 314 discussed above with respect to FIG. 3A.

The processor 302 may fetch, decode, and execute the machine-readable instructions 356 to encrypt the URL while preserving a format of at least a portion of the encrypted URL. The instructions 356 may be similar to the instructions 318 discussed above with respect to FIG. 3A.

The processor 302 may fetch, decode, and execute the machine-readable instructions 358 to store the encrypted timestamps and the encrypted URL. The processor 302 may store the encrypted timestamps and the encrypted URL in the data store 304.

Figure 5:
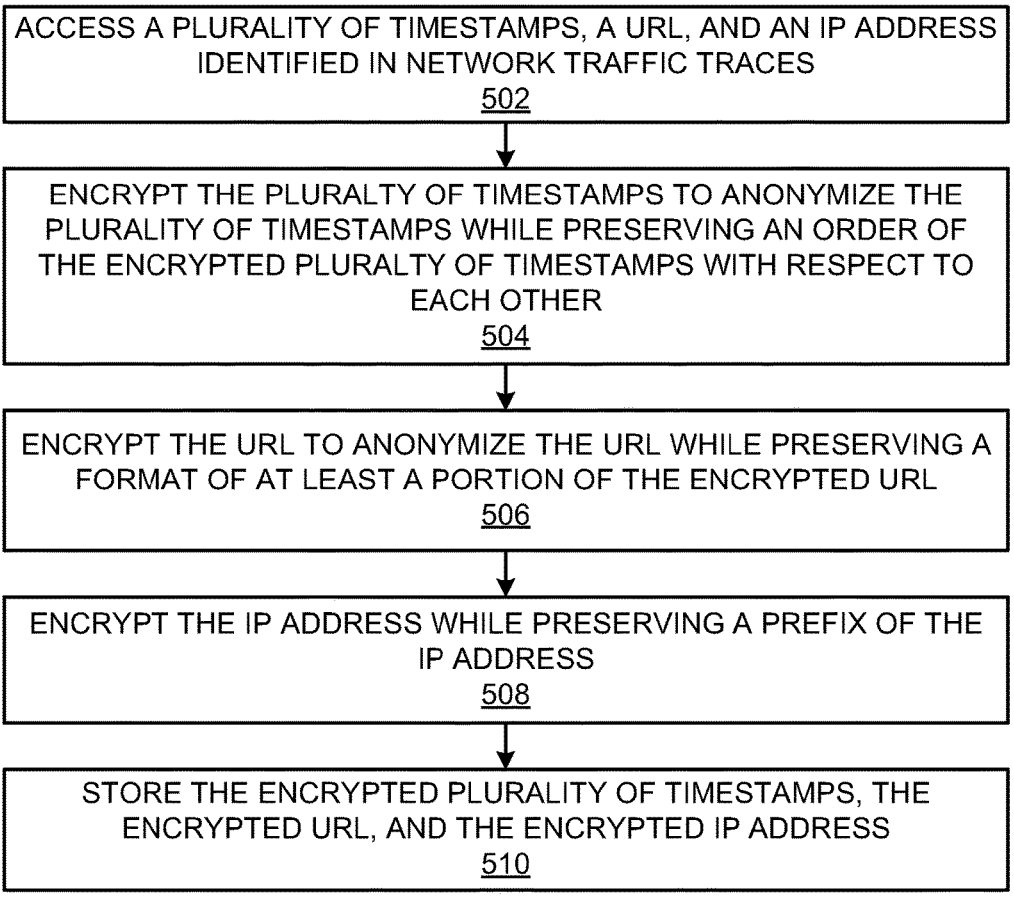
FIG. 5 shows a flow diagram of an example method for encrypting various portions of data contained in network traffic traces while enabling partial analysis to be implemented on the encrypted data.

Turning now to FIG. 5, there is shown a flow diagram of an example method 500 for encrypting various portions of data contained in network traffic traces while enabling partial analysis to be implemented on the encrypted data. It should be understood that the method 500 depicted in FIG. 5 may include additional operations and that some of the operations described therein may be removed and/or modified without departing from a scope of the method 500. The description of the method 500 is also made with reference to the features depicted in FIGS. 1-4 for purposes of illustration. Particularly, the processor 302 may execute some or all of the operations included in the method 500.

At block 502, the processor 302 may access a plurality of timestamps, a URL, and an IP address identified in network traffic traces. The processor 302 may access the network traffic traces from a service or apparatus that may track the network traffic traces as discussed herein.

At block 504, the processor 302 may encrypt the plurality of timestamps to anonymize the plurality of timestamps while preserving an order of the encrypted plurality of timestamps with respect to each other. In addition, the processor 302 may encrypt the plurality of timestamps while enabling future timestamps to be identified in order with respect to the plurality of timestamps. The processor 302 may encrypt the plurality of timestamps as discussed herein.

At block 506, the processor 302 may encrypt the URL to anonymize the URL while preserving a format of at least a portion of the encrypted URL. The processor 302 may encrypt the URL as discussed herein.

At block 508, the processor 302 may encrypt the IP address while preserving a format of a prefix of the IP address. The processor 302 may encrypt the IP address through any suitable process, for instance, as discussed above with respect to FIG. 3A.

At block 510, the processor 302 may store the encrypted plurality of timestamps, the encrypted URL, and the encrypted IP address in a data store 304. The processor 302 may store the encrypted plurality of timestamps, the encrypted URL, and the encrypted IP address in the data store 304, which may be in direct communication with the processor 302 or may communicate with the processor 302 via a network (not shown). According to examples, the processor 302 may perform analytics on the network traffic traces using the encrypted plurality of timestamps and the encrypted URL without decrypting the encrypted plurality of timestamps or the encrypted URL. In addition, or in other examples, the processor 302 may perform analytics on the network traffic traces using the encrypted plurality of timestamps, the encrypted URL, and the encrypted IP address, without decrypting the encrypted plurality of timestamps, the encrypted URL, or the encrypted IP address.

Some or all of the operations set forth in the method 500 may be contained as utilities, programs, or subprograms, in any desired computer accessible medium. In addition, the method 500 may be embodied by computer programs, which may exist in a variety of forms. For example, the method 500 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor;
   a memory on which is stored machine readable instructions to cause the processor to:
   access network traffic traces including:
   a plurality of timestamps, the plurality of timestamps having an order with respect to each other;
   a uniform resource locator (URL) that includes a host portion, an object portion, and a query portion;
   encrypt the plurality of timestamps to anonymize the plurality of timestamps while preserving the order of the plurality of timestamps with respect to each other;
   convert the URL into an integer value;
   encrypt the integer value;
   convert the encrypted integer value into a string of characters to encrypt the URL to anonymize the URL while preserving a format of the host portion and the object portion; and
   store the encrypted plurality of timestamps and the encrypted URL in a data store.

2. The apparatus of claim 1, wherein the instructions are further to cause the processor to:
   convert the plurality of timestamps into a plurality of respective integer values; and
   encrypt the plurality of respective integer values using an order-preserving encryption operation.

3. The apparatus of claim 2, wherein the instructions are further to cause the processor to:
   build a search tree containing the plurality of encrypted integer values corresponding to the plurality of timestamps; and
   wherein the order-preserving encryption operation includes encoding each value of the plurality of encrypted integer values as a path from a root of the search tree to the value in the search tree.

4. The apparatus of claim 3, wherein the instructions are further to cause the processor to:
   access additional network traffic traces including additional timestamps, the additional timestamps having an order with respect to each other and the plurality of timestamps; and
   encrypt the additional timestamps to anonymize the additional timestamps while preserving the order of the additional timestamps with respect to each other and with the plurality of timestamps.

5. The apparatus of claim 4, wherein the instructions are further to cause the processor to:
   convert the additional timestamps into respective additional integer values;
   encrypt the additional integer values using an order-preserving encryption operation; and
   add the encrypted additional integer values into the search tree according to the order of the encrypted additional integer values with respect to each other and the plurality of encrypted integer values.

6. The apparatus of claim 1, wherein the instructions are further to cause the processor to:
   perform analytics on the network traffic traces using the encrypted plurality of timestamps and the encrypted URL without decrypting the encrypted plurality of timestamps or the encrypted URL.

7. The apparatus of claim 1, wherein the network traffic traces further include an IP address, and wherein the instructions are further to cause the processor to:
   encrypt the IP address while preserving a format of a prefix of the IP address.

8. A method comprising:
   accessing, by a processor, a plurality of timestamps and a uniform resource locator (URL) corresponding to network traffic traces, wherein the URL includes a host portion, an object portion, and a query portion;
   encrypting, by the processor, the plurality of timestamps to anonymize the plurality of timestamps while preserving an order of the encrypted plurality of timestamps with respect to each other;
   converting, by the processor, the URL into integer values;
   encrypting, by the processor, the integer values;
   converting, by the processor, the encrypted integer values into a string of characters to encrypt the URL to anonymize the URL while preserving a format of the host portion and a format of the object without preserving a format of the query portion; and storing the encrypted plurality of timestamps and the encrypted URL.

9. The method of claim 8, further comprising:

converting the plurality of timestamps into a plurality of respective integer values; and wherein encrypting the plurality of timestamps comprises encrypting the plurality of respective integer values.

10. The method of claim 9, further comprising:

building a search tree containing the plurality of encrypted integer values corresponding to the plurality of timestamps; and wherein encrypting the plurality of timestamps comprises encoding each value of the plurality of encrypted integer values as a path from a root of the search tree to the value in the search tree.

11. The method of claim 10, further comprising:

accessing additional network traffic traces including additional timestamps;

converting the additional timestamps into respective additional integer values;

encrypting the additional integer values to anonymize the additional timestamps; and adding the encrypted additional integer values to the search tree according to an order of the encrypted additional integer values with respect to each other and the plurality of timestamps.

12. The method of claim 8, further comprising:

performing an analysis on the network traffic traces using the encrypted plurality of timestamps and the encrypted URL without decrypting the encrypted plurality of timestamps or the encrypted URL.

13. The method of claim 8, further comprising:

accessing a plurality of Internet Protocol (IP) addresses corresponding to network traffic traces, the plurality of IP addresses including prefixes; and encrypting the plurality of IP addresses while preserving the formats of the prefixes of the IP addresses.

14. A non-transitory computer readable medium on which is stored machine readable instructions that when executed by a processor, cause the processor to:

access network traffic traces including a plurality of timestamps and a uniform resource locator (URL), wherein the URL includes a host portion, an object portion, and a query portion;

encrypt the plurality of timestamps to anonymize the plurality of timestamps while preserving an order of the plurality of timestamps with respect to each other;

convert the URL into integer values;

encrypt the integer values;

convert the encrypted integer values into a string of characters to encrypt the URL to anonymize the URL while preserving a format of the host portion and a format of the object without preserving a format of the query portion; and store, in a data store, the encrypted plurality timestamps and the encrypted URL.

15. The non-transitory computer readable medium of claim 14, wherein the instructions are further to cause the processor to:

convert the plurality of timestamps into a plurality of respective integer values; and encrypt the plurality of respective integer values to encrypt the plurality of timestamps.

16. The non-transitory computer readable medium of claim 15, wherein the instructions are further to cause the processor to:

build a search tree containing the plurality of encrypted integer values corresponding to the plurality of timestamps; and encode each value of the plurality of encrypted integer values as a path from a root of the search tree to the value in the search tree to preserve the order of the plurality of timestamps with respect to each other.

17. The non-transitory computer readable medium of claim 14, wherein the instructions are further to cause the processor to:

perform analytics on the network traffic traces using the encrypted plurality of timestamps and the encrypted URL without decrypting the encrypted plurality of timestamps or the encrypted URL.

18. The non-transitory computer readable medium of claim 14, wherein the network traffic traces further include an IP address, and wherein the instructions are further to cause the processor to:

encrypt the IP address while preserving a format of a prefix of the IP address.

19. The non-transitory computer readable medium of claim 14, wherein the instructions are further to cause the processor to:

access additional network traffic traces including additional timestamps, the additional timestamps having an order with respect to each other and the plurality of timestamps; and encrypt the additional timestamps to anonymize the additional timestamps while preserving the order of the additional timestamps with respect to each other and with the plurality of timestamps.

20. The non-transitory computer readable medium of claim 19, wherein the instructions are further to cause the processor to:

convert the additional timestamps into respective additional integer values; and encrypt the additional integer values using an order-preserving encryption operation.

* * * * *